United States Patent
Hofmann et al.

(10) Patent No.: US 7,615,715 B2
(45) Date of Patent: Nov. 10, 2009

(54) CABLE BUSHING DEVICE

(75) Inventors: Gerd Hofmann, Eberbach (DE); Reiner Naumann, Mannheim (DE)

(73) Assignee: Cooper Crouse-Hinds GmbH, Soest (DE)

( * ) Notice: Subject to any disclaimer, the term of this patent is extended or adjusted under 35 U.S.C. 154(b) by 0 days.

(21) Appl. No.: 11/910,512

(22) PCT Filed: Feb. 3, 2006

(86) PCT No.: PCT/EP2006/000952

§ 371 (c)(1),
(2), (4) Date: Jan. 30, 2008

(87) PCT Pub. No.: WO2006/105820

PCT Pub. Date: Oct. 12, 2006

(65) Prior Publication Data

US 2008/0314637 A1    Dec. 25, 2008

(30) Foreign Application Priority Data

Apr. 4, 2005    (DE) .................. 20 2005 005 297 U

(51) Int. Cl.
*H02G 3/18* (2006.01)
(52) U.S. Cl. .................. 174/668; 174/152 G; 174/151; 174/135; 174/669; 174/660; 16/2.1; 248/56
(58) Field of Classification Search ......... 174/652–659, 174/665–669, 152 G, 153 G, 151, 135; 248/56; 16/2.1, 2.2; 439/98, 110, 604, 274
See application file for complete search history.

(56) References Cited

U.S. PATENT DOCUMENTS 2,111,419 A * 3/1938 Crotty ........................ 277/606
3,206,539 A * 9/1965 Kelly ......................... 174/68.3
4,306,698 A * 12/1981 Gonia et al. ............... 248/74.1
4,857,021 A * 8/1989 Boliver et al. ............... 439/801
6,150,607 A * 11/2000 Weyl et al. .................. 174/667

(Continued)

FOREIGN PATENT DOCUMENTS

DE    26 07 164    8/1977

(Continued)

*Primary Examiner*—Dhiru R Patel
(74) *Attorney, Agent, or Firm*—Fish & Richardson P.C.

(57) ABSTRACT

A cable bushing device is used to pass an electrical cable through, in particular, two adjacent housings which are explosion and/or flame-proof. The cable bushing device includes a sleeve-like external body which can be inserted by the opposite first and second end sections into corresponding housing bores. Furthermore, the device has an insert inserted into an axial opening of the external body for retaining the electrical cables passed through the device and a fixing device for fastening the device to at least one housing. To improve a cable bushing device of this nature such that the assembly is simplified while retaining all the positive properties with regard to explosion and/or flame-proof protection and at the same time wider tolerances are possible in the manufacture of the housing bore, the fixing device has on the first end section an external thread formed to match an internal thread of the corresponding housing bore, a mounting nut which can be screwed onto the first end section and a limit-stop element assigned to the second end section and which essentially protrudes radially outwards.

15 Claims, 3 Drawing Sheets

U.S. PATENT DOCUMENTS

Figure 1:
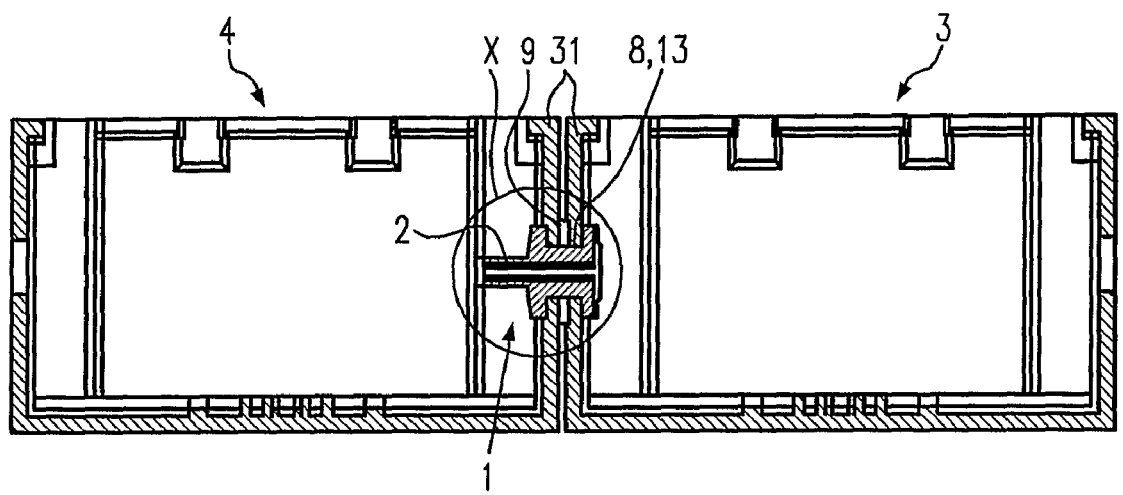

| | | | |
|---|---|---|---|
| 6,215,065 B1 * | 4/2001 | Cox | 174/656 |
| 6,777,616 B2 * | 8/2004 | Beele | 174/650 |
| 6,951,984 B2 * | 10/2005 | Buchberger | 174/360 |
| 7,244,895 B1 * | 7/2007 | Borzabadi | 174/650 |

FOREIGN PATENT DOCUMENTS

| | | |
|---|---|---|
| GB | 598321 | 2/1948 |
| NL | 9300229 | 9/1994 |

* cited by examiner

CABLE BUSHING DEVICE

The invention relates to a cable bushing device for passing electrical cables through, in particular, two adjacent housings which are explosion and/or flame-proof. A cable bushing device of this nature comprises a sleeve-like external body which can be inserted by the opposite first and second end sections into corresponding housing bores. Furthermore, a device of this nature comprises at least one insert for insertion into an axial opening of the external body for holding the electrical cables which are passed through the cable bushing device. A fixing device is used here to mount the cable bushing device on at least one of the housings.

Cable bushing devices of this nature are for example known from DE 3 732 576 and DE 3 710 276. Through these said devices two housings are electrically connected together through housing walls which face one another in that the corresponding electrical cables are passed through the walls and the housing bores formed in them by means of the cable bushing device, also generally in an explosion and/or flame-proof manner. A device of this nature comprises an essentially sleeve-like external body, which is inserted through the housing bores and which terminates in the housings to be joined together electrically. In this external body one or also more inserts are arranged through which the corresponding electrical cables are passed and optionally held or fixed. In order to fix in particular the external body with regard to the housing bores or the housing walls, the external body generally comprises two external threads as fixing device, with which it is screwed to corresponding internal threads in each of the housing bores.

Through the use of a fixing device of this nature with two external and two corresponding internal threads the appropriate explosion and/or flame-proof protection results, wherein optionally additional sealing elements or similar features are provided. However, the alignment of the housing bores must be very accurate so that a screwed joint of this nature is possible without faults. Similarly, extremely narrow tolerances apply to the corresponding threads, so that not only the alignment of the housing bores takes place correctly with respect to the external body, but rather also a trouble-free screwing action is possible.

Furthermore, with the prior state of the art it should be noted that with an external body already screwed into a housing bore and appropriately fixed for mounting in the other housing bore, essentially the complete second housing must be rotated to form the screw joint with the external body. This requires a relatively large amount of space for rotating the housing itself and is sometimes possible only with restrictions or not possible at all. In addition, when rotating the housing itself the corresponding assignment of the internal thread of the housing bore and the external thread of the external body is extremely difficult due in part to the lack of alignment of the housing bore and the external body.

The object of the invention is therefore to improve a cable bushing device of the type mentioned in the introduction such that the assembly is simplified with the retention of all positive properties with regard to explosion and/or flame-proof protection and also wider tolerances are possible during the production of the housing bores.

The object is solved by the features of Claim 1.

According to the invention only one of the housing bores has an appropriate internal thread into which the external body with the corresponding external thread is screwed. When the cable bushing device is mounted to one housing, the other housing bore can be simply pushed onto the other end section of the external body which has not yet been fixed, because at this point no screwing action takes place between the housing bore and the external body. Thus wider tolerances are possible for this corresponding housing bore.

In this connection, to ensure that the external body is fixed also relative to this housing without an internal thread being formed in its housing bore, a limit-stop element protruding radially outwards is assigned to the corresponding end section of the external body. The said limit-stop element presses from the inner side of the housing onto the corresponding housing wall and fixes it with respect to the housing screwed to the external body. To make the contact pressure between the limit-stop element and the housing wall sufficiently large, a mounting nut, which can be brought into contact against the corresponding inner side of the assigned housing wall, is arranged on the end section of the external body which is screwed to the other housing, wherein due to the nut being screwed onto the first end section, the limit-stop element presses with sufficient contact force onto the inner wall of the other housing. Thus on one hand the cable bushing device is correctly positioned between both housings and on the other hand fixing of the corresponding housings relative to one another occurs simultaneously.

Due to these measures according to the invention, the assembly of the cable bushing device is substantially simplified and can be carried out more quickly. At the same time wider tolerances are possible at least with the housing bore which is not to be screwed, because it is simply pushed onto the second end section of the external body.

The limit-stop element can be placed on the second end section of the external body in various ways after insertion into the corresponding housing bore and fixed to this second end section.

In order to maintain in a simple manner a certain spacing between the housings after insertion of the cable bushing device, the external body can have a spacing element approximately centrally which protrudes at least in some places radially outwards and which is arranged between the housings with the cable bushing device in place. This spacing element can be formed elastic and compressible to facilitate an adequate contact force of the limit-stop element when the mounting nut is screwed on.

In a simple embodiment the spacing element can be formed as a circumferential edge flange around the external body. This flange can be formed in one piece with the external body. The materials for the edge flange and the rest of the external body can be different.

The corresponding end sections of the external body are formed in a circular shape for insertion, wherein the remaining external body outside of these end sections can also have other geometrical shapes. However, to simplify the manufacture of the external body, it can have an essentially circular shaped cross-section and the edge flange can run circumferentially around it in an annular shape.

In order to ensure that the corresponding explosion and/or flame-proof protection can be maintained between the housings in a simple manner, the edge flange can have, in particular on both its side faces facing the housings, a circumferential sealing element. A sealing element of this nature can be for example an O-ring. Furthermore, the side faces can be formed as gap surfaces, wherein the explosion and/or flame-proof protection is in particular ensured.

In order to simplify the fitting of the external body in this connection, the sealing element can be partially arranged in a retaining recess formed in the side face. Thus, the sealing element is held during assembly and release of the sealing element during assembly or also during transport of the cable bushing device is essentially prevented.

In order to be able to also optionally arrange different inserts in the external body, an insert of this nature can be inserted detachably within the axial opening. Different inserts can be used for example for passing through different numbers of electrical cables, for holding electrical cables of different diameters or similar uses.

There is also the possibility of arranging a number of inserts one behind the other in the axial direction of the axial opening, refer for example to DE 3 732 576, and of arranging further spacing bodies between the inserts.

There is also the possibility that only one insert is used, which has at least one receptacle running essentially in the axial direction, which accommodates the electrical cables and optionally also holds them. An appropriate receptacle of this nature can comprise a row of channels through each of which an electrical cable is passed. A receptacle of this nature can also have one or more insertion openings for plugging in plug connection devices fitted to the electrical cables. In this way essentially no direct passage of an electrical cable occurs through the cable bushing device, but rather the passage occurs via a plug connection device with appropriately mutually matching plug connectors on each of the electrical cables to be connected.

With one example of this type of plug connection device with flat plugs and flat receptacles the plug opening can be formed essentially slot shaped for the insertion of a flat plug of this nature. This type of flat plug is arranged at one end of an electrical cable which is introduced into the cable bushing device from a housing. From the other housing another electrical cable with a corresponding flat receptacle is introduced into the cable bushing device and then connected with a flat plug held in the plug opening.

With a simple embodiment of the above mentioned limit stop the said limit stop can be arranged on the second end section and in particular as a screw-on limit-stop nut. After the arrangement of the external body between both housings and insertion of the corresponding end sections into the assigned housing bores, this nut is fitted to the second end section where it is screwed on. Thus, there is the possibility of screwing on appropriate nuts practically from both ends of the external body and of pressing the assigned housing walls onto the sealing elements of the spacing element or edge flange.

To optionally prevent damage to the housing wall on screwing on the corresponding nuts or also to facilitate fastening relative to the housing wall with relative few revolutions of the corresponding nuts, an essentially annular spacing part can be arranged between the limit-stop nut and/or between the mounting nut and edge flange. With the external body inserted into the corresponding housing bores, this part contacts in each case the housing wall opposite the edge flange and facilitates an adequate fastening through a few revolutions of the corresponding nut.

The effect of this spacing part can also be thus improved if it is formed as a spring washer.

The insertion in particular of the second end section into the housing bore without an internal thread can thus be further simplified if the external body has on at least this end section at least two in particular opposite flat regions on its outer side.

In the following the invention will be explained based on the drawings included in the figures.

Figure 2:
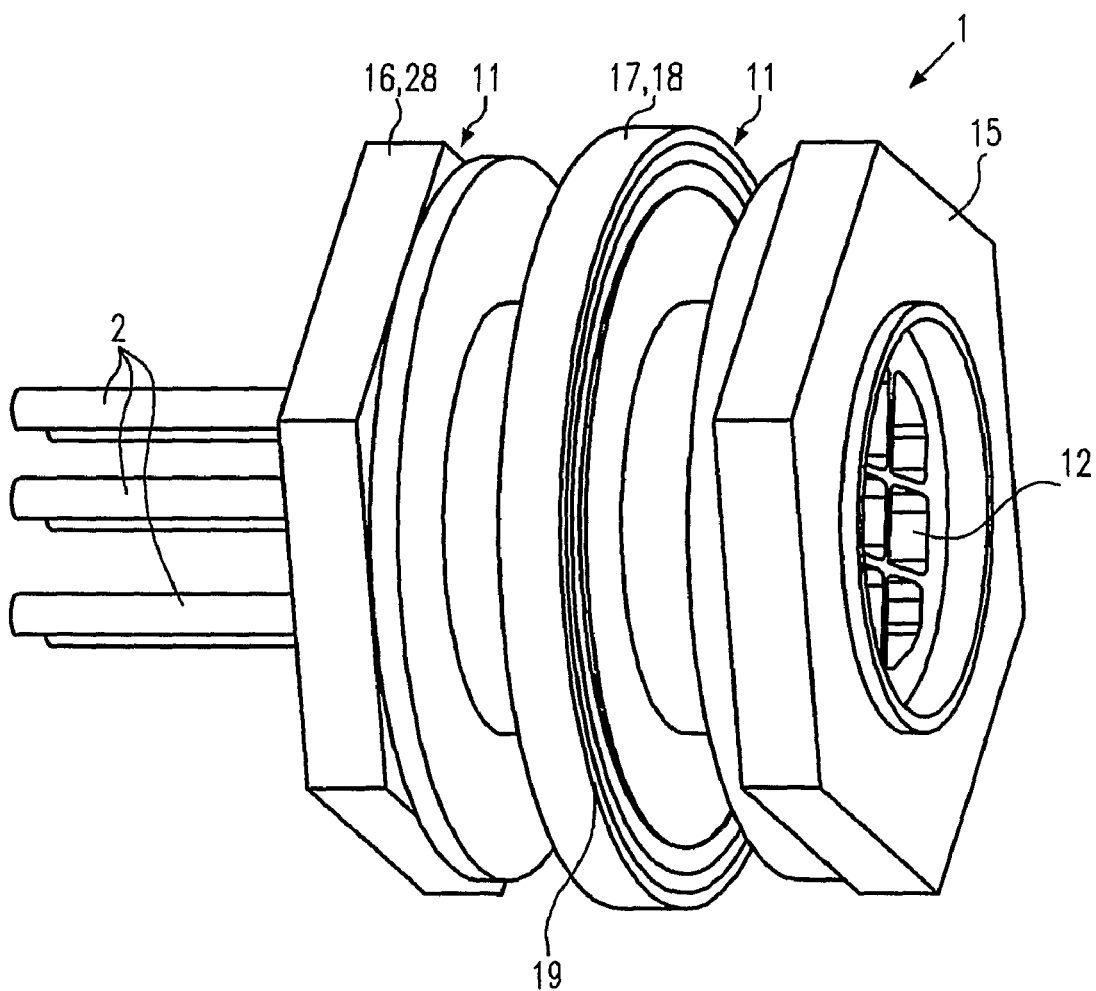
Figure 3:
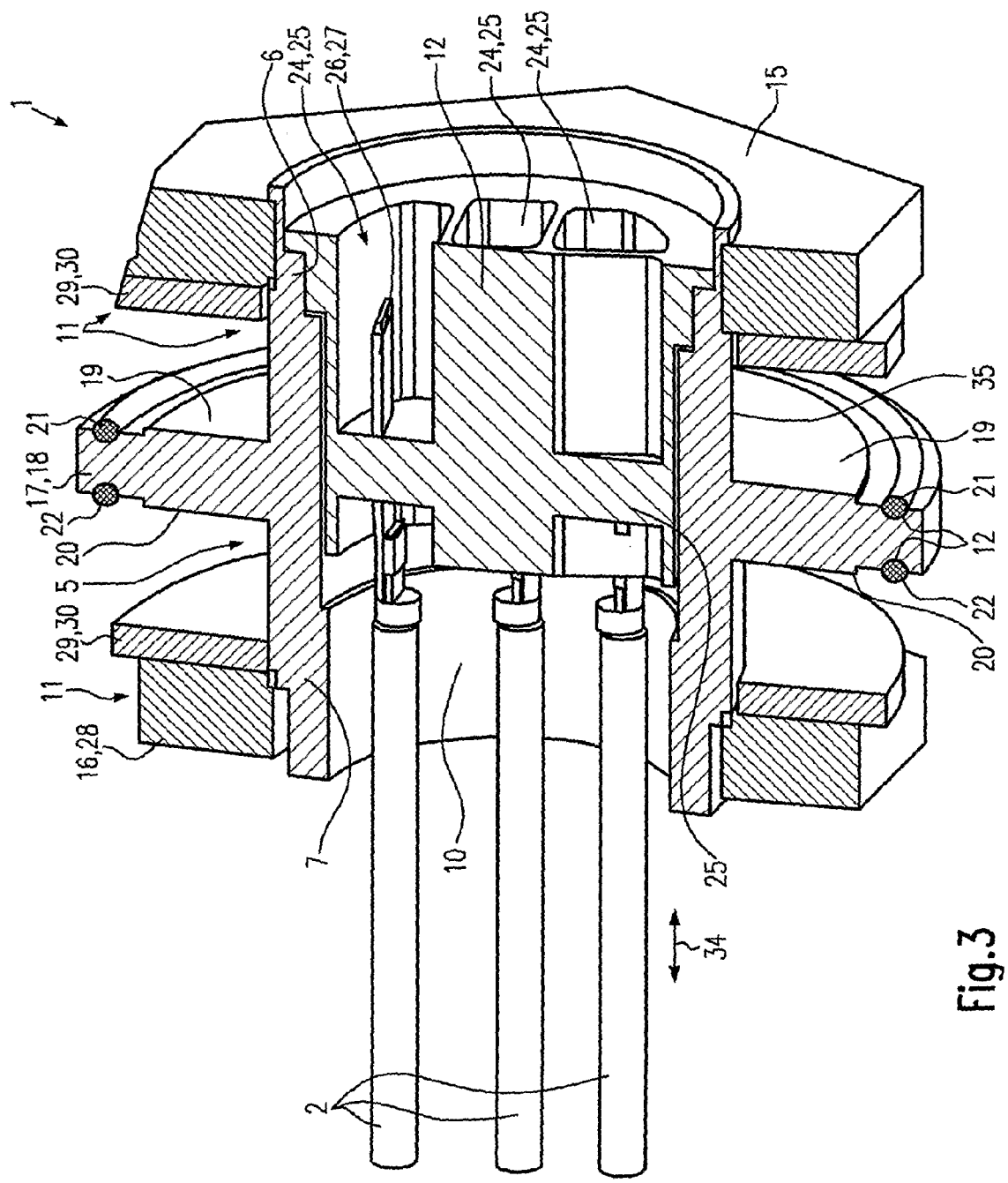
Figure 4:
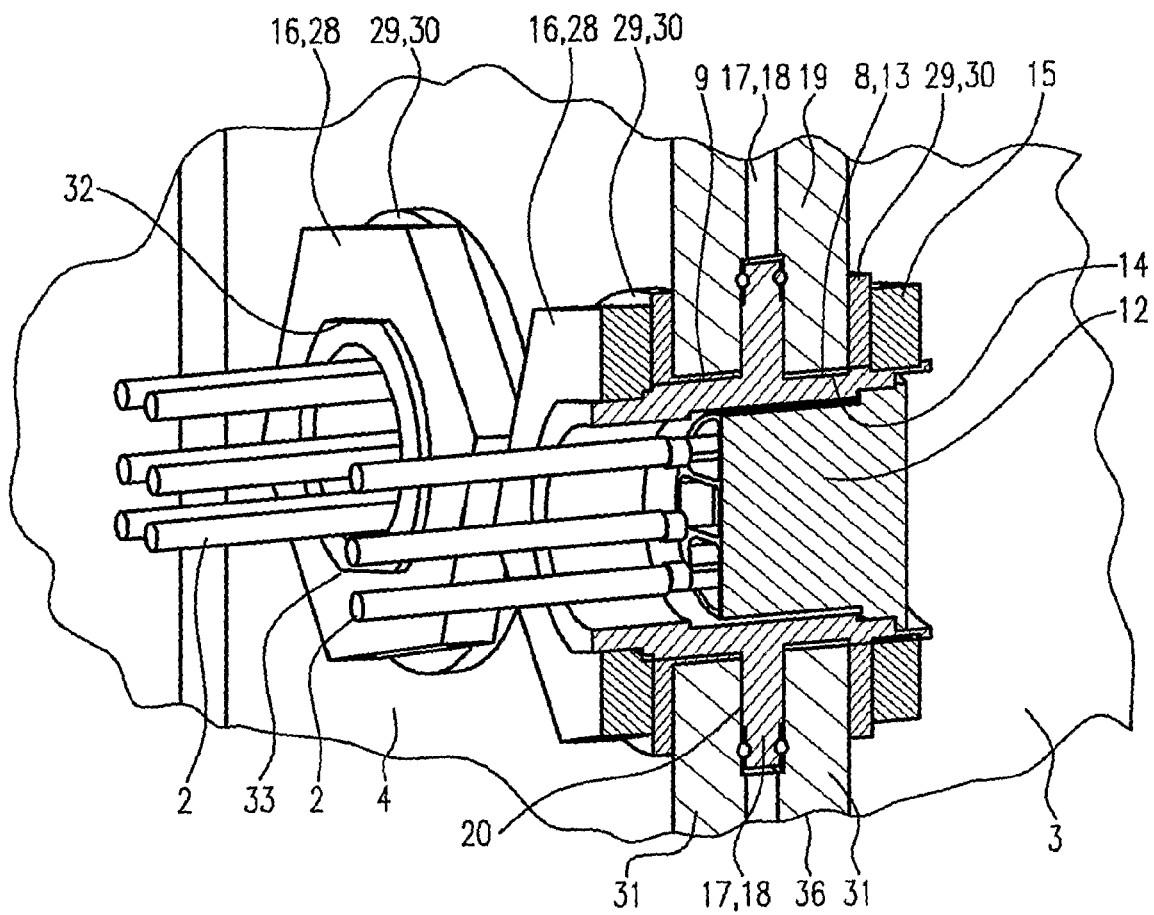

The following are shown:

FIG. 1 a longitudinal section through two adjacently arranged housings provided with a cable bushing device according to the invention;

FIG. 2 an enlarged illustration of the detail "X" of FIG. 1;

FIG. 3 a longitudinal section through the cable bushing device according to FIG. 2; and FIG. 4 a perspective diagonal view from one side of two adjacently arranged cable bushing devices, of which one is illustrated in the longitudinal section according to FIG. 3.

FIG. 1 shows a longitudinal section through two adjacently arranged housings 3 and 4, which are each realised in explosion and/or flame-proof protection. In their opposing housing walls 31 the two housings 3, 4 have housing bores 8, 9 in which a cable bushing device 1 according to the invention is arranged. This is used for the passage of appropriate electrical cables 2 between the housings, wherein this bushing is similarly explosion and/or flame-proof protected. The housing bore 8 assigned to the housing 3 has an internal thread 13, to which a corresponding external thread, refer to the following figures, of the cable bushing device 1 is screwed. A spacing element 17, refer also to the following figures, which is part of the cable bushing device 1, is arranged between the two housing walls 31.

For simplification the electrical cables 2 are shortened and other devices in the housings 3 and 4 are not illustrated.

The following figures show an enlarged illustration of the detail "X" from FIG. 1 in which an embodiment of the cable bushing device 1 according to the invention is illustrated.

The same parts are each identified in the following figures by the same reference numerals and are sometimes only mentioned in connection with a figure.

FIG. 2 is an external view of the cable bushing device 1 illustrated without parts of the housings 3 and 4.

The cable bushing device 1 has an external body 5, refer also to FIG. 3, from which a spacing element 17 protrudes radially outwards at about the middle. Said element is formed essentially as an annular shaped circumferential edge flange 18. On the two side faces 19, 20 of the edge flange 18 sealing elements 21, 22, refer also to FIG. 3, are arranged in corresponding retaining recesses 23. The edge flange 18 is, refer to FIG. 1, arranged between the opposing housing walls 31 and seals them relative to the housing bores 8, 9 via the corresponding sealing elements 21, 22.

The external body 5 has a first end section 6 which is assigned to the housing 3 and a second end section 7 which is assigned to the housing 4. On the first end section 6 an external thread 14 is provided, refer also to FIG. 4, which engages the corresponding internal thread 13 according to FIG. 1 in the housing wall of the housing 3. It is possible to screw the external body 5 into the corresponding housing bore 8 using these two threads 13, 14. This occurs until the edge flange 18 is in contact with its corresponding side face 19 against the outer side of the associated housing wall 31. Furthermore, to fasten the external body 5 in this corresponding position a mounting nut 15 is used which is part of a fixing device 11. The mounting nut 15 is screwed onto the external thread appropriately in the first end section 6. Furthermore, a spring washer 30 is arranged as spacing part 29 between the mounting nut and an inner side of the housing wall, refer also to FIG. 1.

A limit-stop nut 28 is arranged as limit-stop element 16 on the second end section 7 as a further part of the fixing device 11. Analogous to the mounting nut 15 on the second end section 7, this nut can be screwed on by means of a corresponding external thread. A spring washer 30 is positioned as spacing part 29 also between the limit-stop nut 28 and a corresponding inner side of the associated housing wall, refer to FIG. 1.

In FIG. 3 a longitudinal section through the cable bushing device 1 according to FIG. 2 is illustrated. An insert 12 is arranged within an axial opening 10 which extends through the complete external body 5 in the axial direction 34. This insert is in particular arranged detachably within the external body 5. The insert 12 has recesses 24, through which the appropriate electrical leads 2 are passed or are at least arranged with flat plugs 26 as part of a plug connection device 27. For this purpose the recesses 24 have insertion openings 25 in which the flat plugs 26 are inserted and held there. One free end of the respective flat plug 26 protrudes from the corresponding insertion openings 25 opposite to the electrical cables 2 illustrated in FIG. 3 and is used for the connection of flat receptacles, which are not illustrated, to further electrical cables, which together with the flat plugs form the corresponding plug connection device 27. In the illustrated embodiment the insert 12 has a total of six recesses 24 with corresponding insertion openings. However, also other inserts 12 can be used, which have more or fewer recesses and also have channel shaped recesses directly for the passage of electrical cables without the use of corresponding plug connection devices.

In FIG. 3 it can also be seen how the edge flange 18 protrudes radially outwards from an outer side 35 of the external body 5 and surrounds the external body 5 in an annular shape. The corresponding side faces 19, 20 are arranged spaced to spring washers 30 each with the associated nut 15 or 28, wherein between these the housing walls, refer to FIG. 1, are accommodated in the cable bushing device 1 in the housing bores 8, 9.

According to the invention only one external thread 14 is provided on the external body 5 for fastening to a corresponding internal thread 13 of a housing bore 8. On the other end section 7 there is no external thread 14 of this nature and instead the corresponding region of the second end section is only inserted into the associated housing bore 9 so that wider tolerances are possible in the manufacture of a housing bore of this nature and optionally also certain deviations in the alignment of the housing bores 8 and 9 are possible when inserting the cable bushing device 1.

Only a corresponding external thread for the attachment of the limit-stop nut 28 is provided at the free end of the second end section 7.

In FIG. 4 a perspective view on a cable bushing device according to FIG. 2 is illustrated from a diagonally frontal position, wherein a second cable bushing device 1 is positioned directly adjacent to it. They are of the same type of construction, refer also to the previous description.

In FIG. 4 it can be seen how fastening of the cable bushing device 1 to the housing walls 31 occurs by screwing the nuts 15 and 28, wherein the corresponding edge flange 18 is arranged between these housing walls. With its circumferential sealing elements 21, 22, which are formed as O-rings, the edge flange 18 is in contact with the corresponding outer sides of the housing walls 31. An essentially circular indentation 36, which is used for the partial accommodation of the edge flange 18, can be provided in the facing outer sides of the housing walls 31. Thus, the sealing effect between the housing wall and edge flange with the sealing elements situated between them is further improved.

In the following the insertion of a cable bushing device according to the invention is briefly described based on the included figures.

The cable bushing device 1 is screwed into the housing bore 8 with internal thread 13 by means of the external body 5 and the corresponding external thread 14 on the first end section 6. The screwing-in action takes place until the edge flange 18 is in contact with the outer side of the corresponding housing wall 31. Then, the spring washer 30 as the spacing part 19 can be placed in position from the inner side of the housing wall 31 and can be pressed onto the housing wall 31 by means of the mounting nut 15, wherein at the same time fastening of the cable bushing device 1 on the housing 3 occurs. The other housing 4 with the corresponding housing bore 9 is then pushed onto the second end section 7, wherein also certain deviations in the alignment of the housing bore 8, 9 can be tolerated due to the lack of a screwed joint between the second end section 7 and the housing bore 9. After pushing on the corresponding housing bore 9 the other spring washer 30 is pushed onto the second end section 7 and fixing of the spring washer and fastening of the cable bushing device relative to the housing 4 occurs by means of screwing on the limit-stop nut 28.

Due to the detachable fastening of the insert 12 within the external body 5 the insert together with the flat plugs 26 which it holds and the corresponding electrical cables 2 can only be inserted now at this point. There is of course also the possibility of arranging the insert 12 in the external body 5 already when fastening the external body 5 on the housing 3 or of having already arranged it previously.

The cable bushing device is then completed by plugging on appropriate further electrical cables with flat receptacles from the housing 3 which together with the flat plugs 26 form a corresponding plug connection device 27 for the connection of electrical cables 2.

The flat plugs 26 are held within the corresponding slot shaped insertion openings 25 where they can be detachably fastened. There is also the possibility that the flat plugs 26 are encapsulated within the insert 12 at their ends facing the electrical cables 2, refer to FIG. 3, to optionally improve the explosion and/or flame-proof protection. The free ends of the flat plugs 26 which are passed through the insertion openings 25 are not potted, because it is there that the corresponding flat receptacles are plugged on.

The invention claimed is:

1. Cable bushing device for the passage of electrical cables through in particular two adjacent, explosion or flame-proof housings, said cable bushing device comprising:
   a sleeve-like external body, which with oppositely situated first and second end sections can be inserted into corresponding bores in the housings, wherein the external body has at least in some places a spacing element which protrudes radially outwards approximately in the middle and which is arranged between the housings when the cable bushing device is in place;
   at least one insert inserted into an axial opening of the external body for retaining the electrical cables which are passed through the device; and
   a fixing device for fastening the device to the at least to one housing, wherein the fixing device on the first end section has an external thread formed to match an internal thread of the corresponding housing bore, a mounting nut which can be screwed onto the first end section and a limit-stop element assigned to the second end section and which essentially protrudes radially outwards.

2. Cable bushing device according to claim 1, wherein the spacing element is formed around the external body as a circumferential edge flange.

3. Cable bushing device according to claim 2, wherein the external body has essentially a circular cross-section and the edge flange surrounds it in an annular shape.

4. Cable bushing device according to claim 2, wherein the edge flange has a circumferential sealing element in particular on its two side faces facing the respective housings.

5. Cable bushing device according to claim 4, wherein the side faces are formed as gap surfaces to ensure explosion protection.

6. Cable bushing device according to claim 5 wherein the sealing element is arranged partially in a retaining recess formed in the side face.

7. Cable bushing device according to claim 4 wherein the sealing element is arranged partially in a retaining recess (23) formed in the side face.

8. Cable bushing device according to claim 1, wherein the insert is inserted within the axial opening detachably.

9. Cable bushing device according to claim 1, wherein the insert has at least one recess running essentially in the axial direction which accommodates the electrical cables and optionally holds them.

10. Cable bushing device according to claim 9, wherein the recess has at least one insertion opening for inserting a plug connection device part fitted to the electrical cable.

11. Cable bushing device according to claim 10, wherein the insertion opening is formed essentially slot shaped for inserting flat plugs as plug connection device parts.

12. Cable bushing device according to claim 1, wherein the limit-stop element is formed in particular as a screw-on limit-stop nut arranged on the second end section.

13. Cable bushing device according to claim 12, wherein an essentially annular shaped spacing part is arranged in each case between the limit-stop nut or between the mounting nut and the edge flange.

14. Cable bushing device according to claim 13, wherein the spacing part is formed as a spring washer.

15. Cable bushing device according to claim 1, wherein the external body has on its end sections at least two opposingly situated flat regions on its outer side.

* * * * *